Sept. 4, 1951 A. SEGAL 2,566,860
DISPENSING VALVE
Filed April 26, 1946
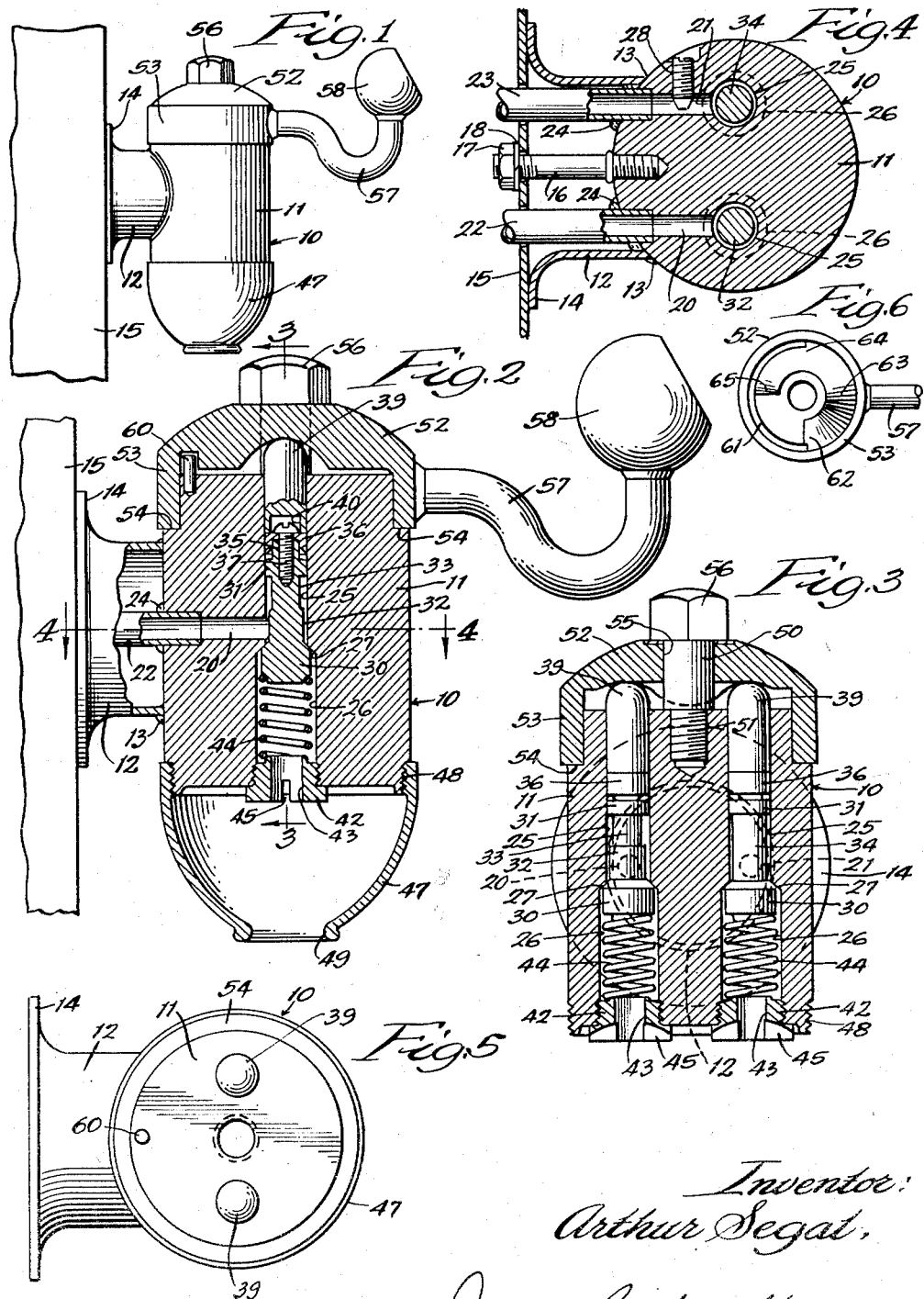
Inventor:
Arthur Segal.
By Dawson, Booth and Spangenberg,
Attorneys.

Patented Sept. 4, 1951

2,566,860

UNITED STATES PATENT OFFICE 2,566,860

DISPENSING VALVE

Arthur Segal, Springfield, Ill., assignor, by mesne assignments, to General Bronze Corporation, a corporation of New York Application April 26, 1946, Serial No. 665,110

8 Claims. (Cl. 222—145)

This invention relates to dispensing valves and more particularly to dispensing valves for dispensing carbonated water and for mixing and dispensing carbonated water and syrup.

The principal object of this invention is to provide an improved valve of this character, which is inexpensive to manufacture and assemble, and which more positively mixes and dispenses carbonated water and syrup.

Other objects of this invention reside in the details of construction and the particular manner in which the dispensing valve operates.

Further objects and advantages will become apparent to those skilled in the art upon reference to the accompanying specification, claims, and drawing, in which—

Fig. 1 is a side elevational view of the dispensing valve attached to a fountain fixture;

Fig. 2 is an enlarged vertical sectional view through the valve;

Fig. 3 is an enlarged sectional view taken substantially along the line 3—3 of Fig. 2;

Fig. 4 is an enlarged sectional view taken substantially along the line 4—4 of Fig. 2;

Fig. 5 is a plan elevational view with the cap removed; and

Fig. 6 is an elevational view of the bottom of the cap.

The dispensing valve is generally designated at 10 and includes a valve body 11. Secured to the valve body 11 is a skirt 12 which may be brazed or welded to the valve body as at 13, the skirt being provided with a flange 14 for abutting the surface of the fountain fixture 15. A stud 16, screw threadedly mounted in the valve body 11, may extend through a suitable opening in the fountain fixture 15 and may be provided with a nut 17 and lock washer 18 for securing the valve body in place on the fountain fixture 15.

The valve body is provided with a pair of supply ports 20 and 21 in which are located supply pipes 22 and 23. The supply pipes may be welded in place as shown at 24. For purposes of illustration herein, the supply port 20 delivers carbonated water and the supply port 21 delivers syrup such as root beer, Coca-Cola, ginger ale, and the like.

The valve body is provided with a pair of vertically arranged passages, each passages having a smaller portion 25 and a larger portion 26 forming a valve seat 27 therebetween. The fluid supply passages 20 and 21 open into the smaller portions 25 of the passages adjacent the valve seat 27. The rate of flow of syrup into the valve passage may be controlled by a needle valve 28 screw threadedly mounted in the valve body 11 and extending into the supply port 21.

Mounted in each passage is a valve having an enlarged head 30 located in the larger portion 26, and a small head 31 located in the smaller portion 25 of the passage. The valve shown in Fig. 2 and at the left side of Fig. 3 controls the supply of carbonated water and the bridging portion of the valve between the heads 30 and 31 is formed of two diameters 32 and 33 while the valve shown at the right of Fig. 3, which controls the supply of syrup, is provided with a bridging member between the heads 30 and 31 having a single diameter 34. Each valve is provided with an extension 35 for receiving a cup-shaped washer 36 preferably made of rubber or rubber composition, the cup-shaped washer being held in place on the end of each valve by screws 37.

The valves are operated by plungers 39 operating in the smaller portion 25 of the passages and the plungers 39 are provided with pockets 40 at their lower ends for accommodating the heads of the screws 37. The cup-shaped washers 36 operate to seal the valve against flow of fluid upwardly through the smaller portion 25 of the passages.

The lower extremities of the larger portions 26 of the passages are screw threaded for receiving retainers 42 provided with openings 43 therethrough. Springs 44 are located between the retainers 42 and the large heads 30 of the valves for holding the valves seated against the seats 27. The retainers 42 are provided with slots 45 by which they may be screwed into place.

The bottom of the valve body 11 carries a collecting chamber 47 which may be screw threaded thereon as at 48 and the collecting chamber is provided with a central opening 49 for dispensing the carbonated water and syrup.

The top of the body 11 adjacent the plungers 39 is provided with a stud 50 screw threaded into the valve body as at 51. A cap 52 is rotatably mounted on the stud 50 and is provided with a flange 53 riding on an annular shoulder 54 formed in the valve body 11. A nut 56 carried by the stud 50 rotatably holds the cap 52 in place. The cap 52 is provided with a handle 57 and a knob 58 to assist in rotating the cap.

The upper surface of the valve body 11 is provided with a pin 60 which extends into an arcuate slot 61 formed in the under surface of the cap 52, the slot cooperating with the pin to limit the amount of rotation of the cap with respect to the valve body. The under surface of the cap is provided with cam surfaces for depressing the plungers 39 against the action of the springs 44 and in this connection a low surface 62, a high surface 63, a low surface 64, and a high surface 65 are provided. The high surface 63 tapers off gradually to the low surfaces 64 and 62, while the high surface 65 tapers off gradually to the low surface 64 but drops off abruptly to the low surface 62.

With the cap 52 in the position shown in the drawing, both valves are closed with the large heads 30 seating against the seats 27 so that no fluid flows from the supply ports 20 and 21. At this time the plungers 39 are engaging the low surfaces 62 and 64.

If the cap 52 is rotated in a counter-clockwise direction, as viewed in Fig. 6, the high cam surface 63 will depress the plunger 39 which controls the supply of carbonated water but the other plunger 39 will not be depressed, it riding free between the low surface 62 and the abrupt high surface 61. In this way the valve controlling the supply of carbonated water is open while that controlling the supply of syrup remains closed. When the carbonated water valve is open the carbonated water flowing from the supply pipe 20 collects in the chamber formed by the passage 25 and the small diameter 33 of the valve. It then passes from this chamber through the restriction caused by the larger diameter 32 of the valve and this restriction has the action of breaking up the carbonated water to give more zest to it upon delivery to the ultimate receptacle. The carbonated water then flows past the valve seat 27 and down along the spring 47 and out through the opening 43 in the retainer 42, and the spring and this latter opening also have a tendency to further break up the carbonated water. The carbonated water is then collected in the collecting chamber 47 and discharges from the central opening 49. In this way the carbonated water as it is dispensed is materially broken up to release the gas therein for the purpose of adding zest thereto.

If, however, the cap 52 is rotated in a clockwise direction from the position shown in Fig. 6, the high surface 65 depresses the plunger which controls the valve for the carbonated water and the high surface 63 depresses the plunger 39 which controls the valve for the syrup. Therefore, both syrup and carbonated water are delivered at the same time. The syrup flows from the supply port 21 into the smaller passage 25 between the heads 30 and 31, past the valve seat 27 and spring 44, and through the opening 43 into the collecting chamber 45. The rate of flow of syrup is regulated by the needle valve 28. The carbonated water is delivered to the collecting chamber 47 in the same manner as outlined above. The carbonated water and the syrup are mixed in the collecting chamber 47 and are dispensed in a mixed condition through the central opening 49.

Since the carbonated water thus delivered is broken up to add zest thereto, it materially aids in the mixing of the carbonated water with the syrup.

Since the surfaces of the cams between the low and high surfaces 62—65 are gradual, the rate of flow of carbonated water and syrup from the dispensing valve may also be regulated by the amount of rotation of the cap 52.

While for purposes of illustration one form of this invention has been disclosed, other forms thereof may become apparent to those skilled in the art by reference to this disclosure, and, therefore, this invention is to be limited only by the scope of the appended claims and prior art.

I claim as my invention:

1. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, and a plunger in the smaller portion of the passage for moving the valve against the action of the spring to permit fluid to discharge from the supply port through the opening in the retainer.

2. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, a plunger in the smaller portion of the passage for moving the valve against the action of the spring to permit fluid to discharge from the supply port through the opening in the retainer, and a cup-shaped washer carried by the small head of the valve for sealing the smaller portion of the passage.

3. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, a plunger in the smaller portion of the passage for moving the valve against the action of the spring to permit fluid to discharge from the supply port through the opening in the retainer, a stud carried by the end of the valve body having the smaller portion of the passage, a cap rotatably carried by the stud, and a cam on the cap for moving the plunger when the cap is rotated.

4. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, and a plunger in the smaller portion of the passage for moving the valve against the action of the spring to permit fluid to discharge from the supply port through the opening in the retainer, the portion of the valve between the two heads being of different diameters for collecting and breaking up the fluid flowing thereby.

5. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, a plunger in the smaller portion of the passage for moving the valve against the action of the spring to permit fluid to discharge from the supply port through the opening in the retainer, a cup-shaped washer carried by the small head of the valve for sealing the smaller portion of the passage, a stud carried by the end of the valve body having the smaller portion of the passage, a cap rotatably carried by the stud, and a cam on the cap for moving the plunger when the cap is rotated.

6. A dispensing valve comprising, a valve body, a cylindrical passage therethrough and of two diameters forming a valve seat therebetween, a fluid supply port opening into the smaller portion of the passage adjacent the valve seat, a valve in the passage having a large head in the larger portion of the passage for seating against the valve seat and a small head in the smaller portion of the passage on the opposite side of the supply port, a retainer having an opening therethrough at the end of the larger portion of the passage, a spring between the retainer and the large head for seating the large head against the valve seat, a plunger in the smaller portion of the passage for moving the valve against the action of the spring to permit fluid to discharge from the supply port through the opening in the retainer, the portion of the valve between the two heads being of different diameters for collecting and breaking up the fluid flowing thereby, and a cup-shaped washer carried by the small head of the valve for sealing the smaller portion of the passage.

7. A dispensing valve comprising, a valve body, a pair of cylindrical passages therethrough, each passage having two diameters forming a valve seat therebetween, a fluid supply port for each passage opening into the smaller portion of the passage adjacent the valve seat, a valve in each passage having a large head in the larger portion of the passage for seating against the valve seat and a small head in the smaller portion of the passage on the opposite side of the supply port, a retainer for each passage having an opening therethrough at the end of the larger portion of the passage, a spring between each retainer and large head for seating the large heads against the valve seats, a plunger in the smaller portions of each of the passages for moving the valves against the actions of the spring to permit fluid to discharge from the supply ports through the openings in the retainers, a stud carried by the end of the valve body having the smaller portions of the passages, a cap rotatably carried by the stud and a pair of cams on the cap positioned to engage the plungers for moving the plungers when the cap is rotated.

8. A dispensing valve comprising, a valve body, a pair of cylindrical passages therethrough, each passage having two diameters forming a valve seat therebetween, a fluid supply port for each passage opening into the smaller portion of the passage adjacent the valve seat, a valve in each passage having a large head in the larger portion of the passage for seating against the valve seat and a small head in the smaller portion of the passage on the opposite side of the supply port, a retainer for each passage having an opening therethrough at the end of the larger portion of the passage, a spring between each retainer and large head for seating the large heads against the valve seats, a plunger in the smaller portions of each of the passages for moving the valves against the actions of the spring to permit fluid to discharge from the supply ports through the openings in the retainers, a stud carried by the valve body adjacent the plungers, a cap rotatably carried by the stud, and cams on the cap for moving the plungers for opening one valve when the cap is rotated in one direction and for opening both valves when the cap is rotated in the opposite direction.

ARTHUR SEGAL.

REFERENCES CITED

The following references are of record in the file of this patent:

UNITED STATES PATENTS

| Number | Name | Date |
|---|---|---|
| 1,334,523 | Cornish | Mar. 23, 1920 |
| 1,413,755 | Messman | Apr. 25, 1922 |
| 1,619,278 | Travis | Mar. 1, 1927 |